United States Patent Office 3,773,834
Patented Nov. 20, 1973

3,773,834
SUPPRESSION OF DIAMINOCYCLOHEXANE FORMATION IN HEXAMETHYLENEDIAMINE MANUFACTURE
Donald B. Bivens and Leo W. Patton, Orange, Tex., assignors to E. I. du Pont de Nemours and Company, Wilmington, Del.
No Drawing. Filed Apr. 21, 1972, Ser. No. 246,426
Int. Cl. C07c 87/14
U.S. Cl. 260—583 K                                4 Claims

ABSTRACT OF THE DISCLOSURE

Formation of by-products such as diaminocyclohexane in the hydrogenation of adiponitrile to hexamethylenediamine over an ion catalyst is reduced by adding from 10 to 500 p.p.m. of a polyhydroxy compound such as sorbitol with the adiponitrile being hydrogenated.

---

A principal use of hexamethylenediamine is as an intermediate in the manufacture of the now well known polyamides which are employed in a variety of applications. A requirement is that the hexamethylenediamine be of high purity so that good quality polyamides meeting the stringent requirements in many applications may be realized.

Among methods that are in use in the industry for the production of hexamethylenediamine is the hydrogenation of adiponitrile over a suitable catalyst such as a metal of Group VIII of the periodic table of elements. Particular processes using an activated iron catalyst are described in U.S. Ser. No. 35,573, filed on May 5, 1970 by B. J. Kershaw, M. S. Pounder and K. R. Wilkins, now U.S. Pat. 3,696,153 and in U.S. Ser. No. 101,167, filed on Dec. 23, 1970 by D. B. Bivens, L. W. Patton and W. E. Thomas, Jr.

A characteristic attending the use of these processes for hydrogenation of adiponitrile is the formation of undesired by-products such as 1,2-diaminocyclohexane. This by-product, though formed in small amounts, is detrimental to the production of high quality polyamides, and it is difficult to remove from the desired hexamethylenediamine because of the proximity of their boiling points, entailing expensive separation procedures.

Accordingly, it is desired to provide a process for the manufacture of hexamethylenediamine in which formation of by-products such as diaminocyclohexane is substantially reduced or eliminated.

STATEMENT OF THE INVENTION

This invention resides in the discovery that reduction of by-product formation in the hydrogenation of adiponitrile to hexamethylenediamine over an iron catalyst is effected by addition of a polyhydroxy compound to the adiponitrile being hydrogenated. The polyhydroxy compound can be an aliphatic, cycloaliphatic or aromatic compound having from 2 to 12 carbon atoms. Polyhydroxy compounds that can be used include sorbitol, mannitol, catechol, pyrogallol, glycerol, ethylene glycol, galactose, glucose, 1,2-propanediol, 1,3-propanediol, cis-1,2-cyclohexanediol, trans-1,2-cyclohexanediol, hydrated glyoxal and tetra(hydroxyethyl)ethylenediamine. Among polyhydroxy compounds, those containing from 2 to 6 hydroxyl groups such as sorbitol, ethylene glycol, glycerol, trans-1,2-cyclohexanediol and hydrated glyoxal are preferred, with sorbitol being especially preferred. The amount of polyhydroxy compound used is in the range of 10 to 500 p.p.m. based on the weight of adiponitrile and preferably 50 to 100 p.p.m. It is observed that inclusion of small amounts of water with the polyhydroxy compound enhances its suppression of undesired by-products.

The process comprises hydrogenation of adiponitrile to hexamethylenediamine in an atmosphere of ammonia at a temperature in the range of about 70° C. to about 260° C., preferably about 90° C. to about 200° C. under a pressure of 250–400 atmospheres in the presence of a substantially elemental iron catalyst in granular form which has been activated with hydrogen as described in U.S. Ser. No. 35,573 or with hydrogen containing from 0.001 to 10 percent by volume of ammonia at a temperature in the range of about 300° C. to about 600° C. as described in U.S. Ser. No. 101,167.

The hydrogenation process of this invention may be performed either as a batch or a continuous process. The hydrogenation reactant and the polyhydroxy compound may be fed separately to the catalyst or the components may be mixed with each other prior to their contacting the catalyst. Activity of the iron catalysts may be somewhat reduced by this treatment.

DESCRIPTION OF THE PREFERRED EMBODIMENTS

The examples to follow are intended to illustrate the present invention more fully but are not to be construed as limiting the scope thereof. Examples 1–3 illustrate carrying out the process of the invention continuously; batchwise hydrogenation is illustrated in control Example 4 and Examples 5–9.

Example 1

A 1.41 lb. sample of iron oxide, predominantly 8–14 mesh, and composed primarily of $Fe_2O_3$ was charged to a 0.875 inch diameter stainless steel fixed bed reactor. The iron oxide was activated at a hot spot temperature of 384° C. and 100 p.s.i.g. pressure with a gas mixture comprised of 12 s.c.f.h. wet hydrogen (saturated at 100 p.s.i.g. and 30° C.), 3 s.c.f.h. dry hydrogen and 0.15 s.c.f.h. of ammonia for a period of 48 hours.

Without removing the activated catalyst the same vessel was used to hydrogenate adiponitrile at 4775 p.s.i.g., using ammonia as solvent at an inlet temperature of 117° C., an exit temperature of 184° C. and an ammonia feed rate of 9.6 lb./hr. The average adiponitrile feed rate was 1.15 lb./lb. catalyst/hr. and the hydrogen make-up was 33 s.c.f.h. A sample taken during the course of the run showed a yield to hexamethylenediamine of 98.6, with a diaminocyclohexane (DCH) concentration of 2100 p.p.m., as determined by gas chromatography.

To the adiponitrile stream there was then added 200 p.p.m. of sorbitol and 1.0 weight percent of deionized water based on the weight of the adiponitrile. Hydrogenation of the thus treated adiponitrile was continued at 4775 p.s.i.g., 117° C. inlet temperature, 161° C. exit temperature and with an average ammonia feed rate of 8.0 lb./hr. The average adiponitrile feed rate over the course of the run which lasted about 20 hours, was 0.80 lb./lb./catalyst/hr., and the hydrogen make-up was 22.5 s.c.f.h. A sample in the course of the run showed a yield of hexamethylenediamine of 98.8% with a DCH concentration of 1000 p.p.m.

Example 2

The catalyst used in Example 1 was washed with ammonia for one hour and stored under a helium atmosphere for six days. Hydrogenation was then resumed using adiponitrile to which had been added 100 p.p.m. of sorbitol and 1.0 weight percent of deionized water. The hydrogenation conditions were 4725 p.s.i.g., 120° C. inlet temperature, 176° C. exit temperature, an average ammonia feed rate of 8.6 lb./hr., and an average adiponitrile feed rate of 1.06 lb./lb. catalyst/hr., and the hydrogen make-up was 26.6 s.c.f.h. A yield of hexamethylenediamine of 98.8% with a DCH concentration of 1300 p.p.m. was obtained.

Example 3

The catalyst used in Examples 1 and 2 was washed in ammonia for two hours and then used in the hydrogenation of additive-free adiponitrile. The hydrogenation conditions were 4700 p.s.i.g., 119° C. inlet temperature, 174° C. exit temperature, an average ammonia feed rate of 8.2 lb./hr., an average adiponitrile feed rate of 0.97 lb./lb. catalyst/hr., and with a hydrogen make-up of 24.5 s.c.f.h. A yield to hexamethylenediamine of 98.8% with a DCH concentration of 2300 p.p.m. was obtained.

To the adiponitrile stream there was added 75 p.p.m. of sorbitol and 0.3 weight percent deionized water based on the weight of adiponitrile. Hydrogenation conditions were 4700 p.s.i.g., 125° C. inlet temperature, 179° C. exit temperature, average ammonia feed rate of 8.0 lb./hr., and average adiponitrile feed rate of 0.97 lb./lb. catalyst/hr., and a hydrogen make-up of 24.5 s.c.f.h. over the period of the run which lasted about 48 hours. A yield to hexamethylene diamine of 98.6% with a DCH concentration of 1700 p.p.m.

Example 4

To a 1-liter stirred autoclave were added 216 g. adiponitrile (ADN), 216 g. ammonia, and 20 g. of iron hydrogenation catalyst activated as described in Example 1. The adiponitrile was hydrogenated at 150° C. and 5000 p.s.i.g. total pressure ($pH_2$=3500 p.s.i.g., $pNH_3$=1500 p.s.i.g.). The reaction consumed the theoretical amount of hydrogen and was completed after 3.47 hours. Gas chromatographic analysis of the reactor contents, after the ammonia had been removed, showed that it contained 3100 p.p.m. of 1,2-diaminocyclohexane.

Example 5

To a 1-liter stirred autoclave were added 216 g. adiponitrile, 216 g. ammonia, 20 g. iron hydrogenation catalyst, and 0.10 g. ethylene glycol (460 p.p.m. based on ADN). The adiponitrile was hydrogenated at 150° C. and 5000 p.s.i.g. total pressure ($pH_2$=3500 p.s.i.g.– $pNH_3$=1500 p.s.i.g.). The reaction consumed 94% of the theoretical amount of hydrogen and was completed after 5.88 hours. Gas chromatographic analysis of the reactor contents, after the ammonia had been removed, showed that it contained 2500 p.p.m. of 1,2-diaminocyclohexane.

Example 6

To a 1-liter stirred autoclave were added 216 g. adiponitrile, 216 g. ammonia, 20 g. iron hydrogenation catalyst, 0.40 g. ethylene glycol, (180 p.p.m. based on ADN) and 0.96 g. water (0.5% based on ADN). The adiponitrile was hydrogenated at 150° C. and 500 p.s.i.g. total pressure ($pH_2$=3500 p.s.i.g.; $pNH_3$=1500 p.s.i.g.). The reaction consumed the theoretical amount of hydrogen and was completed after 2.67 hours. Gas chromatographic analysis of the reactor contents, after the ammonia had been removed, showed that it contained 1400 p.p.m. of 1,2-diaminocyclohexane. The results obtained in this example compared with those obtained in Example 5 illustrate the enhancement of by-product suppression realized by addition of small amounts of water.

Example 7

To a 1-liter stirred autoclave were added 216 g. adiponitrile, 216 g. ammonia, 20 g. iron hydrogenation catalyst, 0.40 g. glycerin and 0.96 g. water. The adiponitrile was hydrogenated at 150° C. and 5000 p.s.i.g. total pressure ($pH_2$=3500 p.s.i.g.; $pNH_3$=1500 p.s.i.g.). The reaction consumed the theoretical amount of hydrogen and was completed after 2.28 hours. Gas chromatographic analysis of the reactor contents after the ammonia had been removed, showed that it contained 1300 p.p.m. of 1,2-diaminocyclohexane.

Example 8

To a 1-liter stirred autoclave were added 216 g. adiponitrile, 216 g. ammonia, 20 g. iron hydrogenation catalyst, 0.040 g. trans-1,2-cyclohexanediol, and 0.50 g. water. The adiponitrile was hydrogenated at 150° C. and 5000 p.s.i.g. total pressure ($pH_2$=3500 p.s.i.g., $pNH_3$=1500 p.s.i.g.). The reaction consumed the theoretical amount of hydrogen and was completed after 2.88 hours. Gas chromatographic analysis of the reactor contents, after the ammonia had been removed, showed that it contained 1900 p.p.m. of 1,2-diaminocyclohexane.

Example 9

To a 1-liter stirred autoclave were added 216 g. adiponitrile, 216 g. ammonia, 20 g. iron hydrogenation catalyst, 0.040 g. glyoxal, and 0.96 g. water. The adiponitrile was hydrogenated at 150° C., and 5000 p.s.i.g. total pressure ($pH_2$=3500 p.s.i.g., $pNH_3$=1500 p.s.i.g.). The reaction consumed the theoretical amount of hydrogen and was completed after 3.98 hours. Gas chromatographic analysis of the reactor content, after the ammonia had been removed, showed that it contained 1700 p.p.m. of 1,2-diaminocyclohexane.

What is claimed is:

1. In a process for the catalytic hydrogenation of adiponitrile to hexamethylenediamine in the presence of ammonia at a temperature in the range of about 70° C. to about 260° C. under a pressure in the range of about 250 to about 400 atmospheres in the presence of a substantially elemental iron catalyst in granular form which has been activated by contacting with hydrogen, at a pressure in the range of 0.01 to 70 atmospheres and containing from 0.001 to 10 percent by volume of ammonia, at a temperature in the range of about 300° C. to about 600° C.; the improvement which comprises feeding with the adiponitrile from 10 to 500 p.p.m., based on the weight of the adiponitrile, of a polyhydroxy compound, the polyhydroxy compound being selected from the group consisting of sorbitol, ethylene glycol, glycerol, trans-1,2-cyclohexanediol and hydrated glyoxal.

2. The process of claim 1 wherein the polyhydroxy compound is sorbitol.

3. The process of claim 2 wherein sorbitol is added with the adiponitrile stream in an amount of 25–100 p.p.m. based on the weight of adiponitrile.

4. The process of claim 3 wherein the hydrogenation of adiponitrile is carried out at a temperature in the range of about 90° C. to about 200° C.

References Cited

UNITED STATES PATENTS

| | | | |
|---|---|---|---|
| 3,696,153 | 10/1972 | Kershaw et al. | 260—583 K |
| 3,260,752 | 7/1966 | Miller et al. | 260—583 K |
| 3,235,600 | 2/1966 | Evans | 260—583 K |

JOSEPH P. BRUST, Primary Examiner

U.S. Cl. X.R.

260—563